United States Patent
Baek

(10) Patent No.: US 9,527,397 B2
(45) Date of Patent: Dec. 27, 2016

(54) APPARATUS AND METHOD FOR PREVENTING OVERSHOOT AT THE BEGINNING OF SLOW CHARGING

(71) Applicant: Hyundai Motor Company, Seoul (KR)

(72) Inventor: Jong-Kil Baek, Chungcheongnam-do (DE)

(73) Assignee: Hyundai Motor Company, Seoul (KR)

( * ) Notice: Subject to any disclaimer, the term of this patent is extended or adjusted under 35 U.S.C. 154(b) by 161 days.

(21) Appl. No.: 14/554,694

(22) Filed: Nov. 26, 2014

(65) Prior Publication Data

US 2016/0046196 A1 Feb. 18, 2016

(30) Foreign Application Priority Data

Aug. 13, 2014 (KR) ........................ 10-2014-0105503

(51) Int. Cl.
*H02J 7/00* (2006.01)
*B60L 11/18* (2006.01)

(52) U.S. Cl.
CPC .......... *B60L 11/1861* (2013.01); *H02J 7/0029* (2013.01); *H02J 2007/0039* (2013.01)

(58) Field of Classification Search
CPC .... Y02T 90/14; Y02T 10/7005; Y02T 90/128; Y02T 10/7088; Y02T 90/163
USPC ........................................................ 320/109
See application file for complete search history.

(56) References Cited

U.S. PATENT DOCUMENTS

| | | | |
|---|---|---|---|
| 7,663,346 B2 | 2/2010 | Wang et al. | |
| 2003/0184262 A1* | 10/2003 | Makhija | ............... H02J 7/0047 320/130 |
| 2010/0228413 A1* | 9/2010 | Fujitake | .................. B60L 11/14 701/22 |
| 2011/0193532 A1* | 8/2011 | Iwanaga | ................ B60K 6/445 320/163 |
| 2012/0280663 A1* | 11/2012 | Lim | ...................... H02J 7/0083 320/149 |
| 2013/0049677 A1* | 2/2013 | Bouman | ................. B60L 1/003 320/106 |

FOREIGN PATENT DOCUMENTS

| | | |
|---|---|---|
| JP | 2009-146172 | 7/2009 |
| JP | 2011-004482 | 1/2011 |
| KR | 10-2003-0095387 | 12/2003 |
| KR | 10-2004-0061237 A | 7/2004 |
| KR | 10-2007-0099507 A | 10/2007 |
| KR | 10-2013-0081973 | 7/2013 |
| KR | 10-2014-0085933 | 7/2014 |

* cited by examiner

*Primary Examiner* — Arun Williams
(74) *Attorney, Agent, or Firm* — Mintz Levin Cohn Ferris Glovsky and Popeo, P.C.; Peter F. Corless

(57) ABSTRACT

An apparatus for preventing overshoot at the beginning of slow charging is provided. The apparatus includes a controller configured to receive initial charging command information during slow charging from electric vehicle supply equipment (EVSE) and generate initial charging information for preventing overshoot using the initial charging command information. The apparatus further includes a charger for performing charging of a battery using the initial charging information, and a battery management system (BMS) configured to generate sensing information by sensing the charger, and charge the battery using the sensing information based on an originally set algorithm of the EVSE after a preset time based on whether the charging of the battery is stabilized.

16 Claims, 4 Drawing Sheets

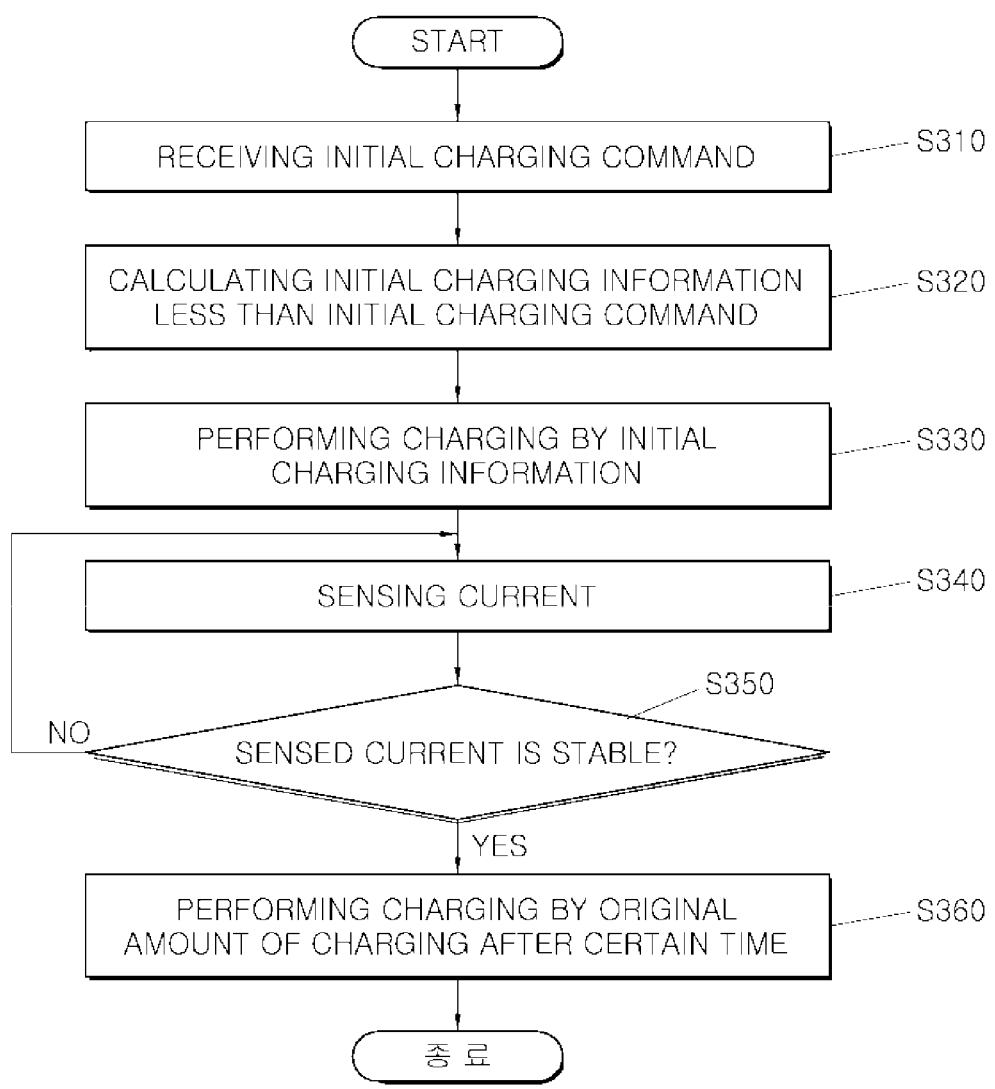

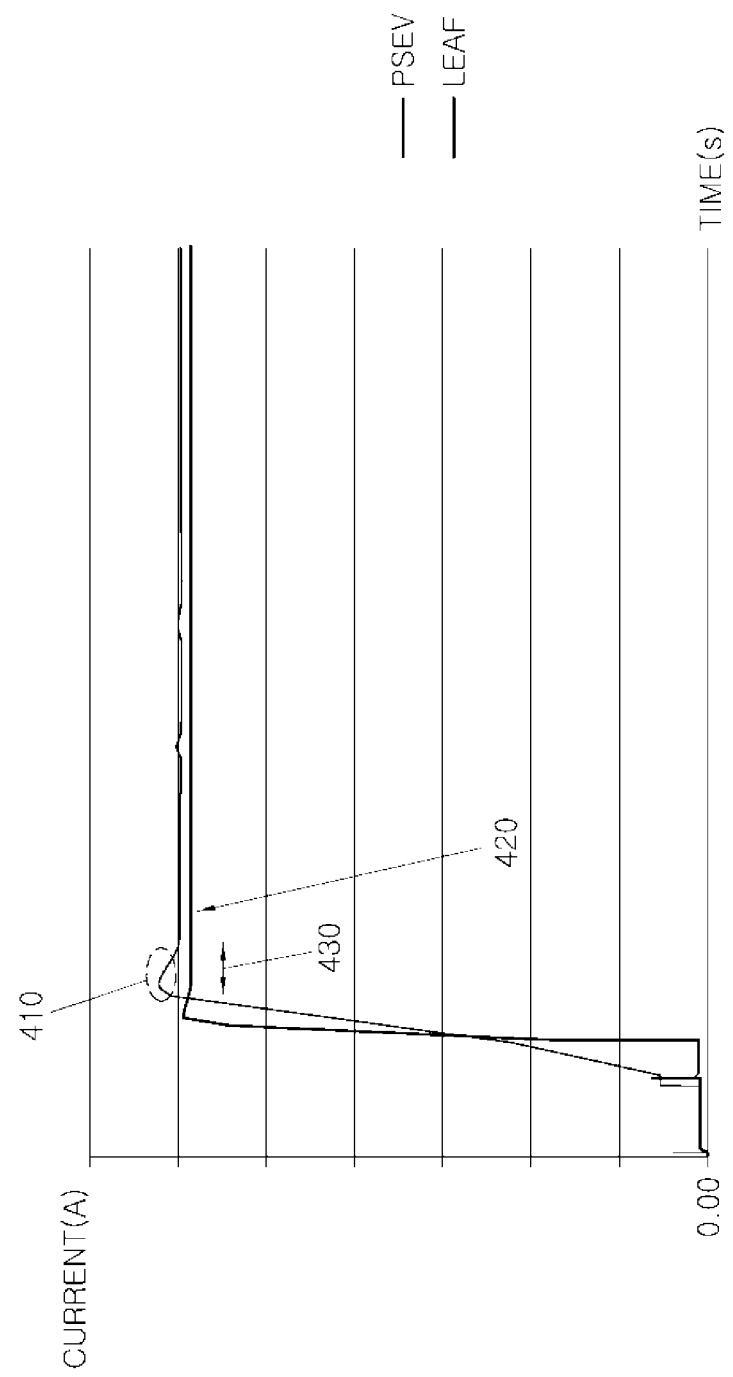

APPARATUS AND METHOD FOR PREVENTING OVERSHOOT AT THE BEGINNING OF SLOW CHARGING

CROSS-REFERENCE TO RELATED APPLICATION(S)

Pursuant to 35 U.S.C. §119(a), this application claims priority to Korean Patent Application No. 10-2014-0105503 filed on Aug. 13, 2014, the entire contents of which are incorporated herein by reference.

TECHNICAL FIELD

The present inventive concepts relate to a battery charging technique; and more particularly, to an apparatus and method for preventing overshoot capable of resolving a phenomenon in which electric vehicle supply equipment (EVSE) does not charge a battery due to overshoot in an initial charging current.

BACKGROUND

Various types of environmentally friendly vehicles, such as electric and hybrid electric vehicles are being developed. Since an electric vehicle is driven using charging/discharging energy of a battery pack, the electric vehicle has been well received by consumers due to improved fuel efficiency and reduction in pollutants emitted from the vehicle compared to an engine-driven vehicle. Thus, a battery, which is a core part of the electric vehicle, is often the subject of interest and study. Particularly, various studies have been performed regarding construction of charging infrastructures for batteries for environmentally friendly vehicles.

Electric vehicle supply equipment (EVSE) connected to a distribution system is typically used to charge a battery for an electric vehicle. Charging interface components such as a charging connector (not shown) and an inlet (not shown) are provided between the EVSE and the electric vehicle. A control pilot signal is generated by the EVSE and is transmitted to the electric vehicle via a charging coupler and a contact. Maximum output of the EVSE is limited when the electric vehicle is slowly charged. When the electric vehicle is charged in excess of the limited output, a charging interruption phenomenon may occur. In particular, the same phenomenon may occur when charging is attempted after a first interruption. For example, when the EVSE is charged by a charging current that exceeds a control pilot (CP) duty (%) of a charger at the beginning of charging, no charging of the battery occurs. Therefore charging is forcibly ended by a fail-safe device for safety reasons when the EVSE uses a current greater than the CP duty (%).

SUMMARY

An aspect of the present inventive concepts is directed to an apparatus and method for preventing overshoot capable of resolving a phenomenon in which electric vehicle supply equipment (EVSE) does not the battery due to overshoot in an initial charging current. Another aspect of the present inventive concepts is directed to an apparatus and method for preventing overshoot capable of reducing a time for which a driver may expect an estimated charging time based on a charging current.

Other objects and advantages of the present inventive concepts may be understood by the following description, and will become apparent with reference to the exemplary embodiments of the present inventive concept. Also, it is obvious to those skilled in the art to which the present inventive concepts pertain that the objects and advantages of the present inventive concepts may be realized by the means as claimed and combinations thereof. To achieve the above objects, the present inventive concepts provides an apparatus and method for preventing overshoot capable of resolving a phenomenon in which EVSE (Electric Vehicle Supply Equipment) is not charged due to overshoot in an initial charging current.

An aspect of the present inventive concepts relates to an apparatus for preventing overshoot which may include a controller configured to receive initial charging command information during slow charging from electric vehicle supply equipment (EVSE) and generate initial charging information for preventing overshoot using the initial charging command information. The apparatus may further include a charger configured to charge a battery using the initial charging information, and a battery management system (BMS) configured to generate sensing information by sensing the battery, and charge the battery using the sensing information based on an originally set algorithm of the EVSE after a preset time based on whether the charging of the battery is stabilized.

The initial charging command information may be a control pilot (CP) duty (%). The initial charging information may be set to be an amount less than an initial amount of charging of the initial charging command information. The stabilization of the charging may be determined based on an input signal which in turn is based on whether the initial charging information of the charger coincides with an output signal based on the initial charging information. The preset time may be about 1 to 3 seconds. The initial charging command information may include initial current command information. The charger may include an on-board charger (OBC).

In addition, communication between the EVSE and the controller may be performed using a technology including, but not limited to a controller area network (CAN), power line communication (PLC), ZigBee, and Bluetooth. The apparatus may further include an output unit configured to output an estimated charging time of the battery calculated using the initial charging information.

In accordance with another exemplary embodiment of the present inventive concepts, an apparatus and method for preventing overshoot at the beginning of slow charging may include receiving initial charging command information during slow charging from EVSE, generating initial charging information for preventing overshoot using the initial charging command information, performing charging of a battery using the initial charging information, generating sensing information by sensing a charger that charges the battery, determining whether the charging of the battery is stabilized using the sensing information, and charging the battery based on an originally set algorithm of the EVSE after a preset time when the charging is stabilized as the determined result. The charging of the battery may be performed using an OBC. The method may further include outputting an estimated charging time of the battery calculated using the initial charging information to an output unit.

BRIEF DESCRIPTION OF THE DRAWINGS

The drawings are provided for reference in describing exemplary embodiments of the present invention, and the spirit of the present invention should not be construed only by the accompanying drawings. The above and other objects, features and other advantages of the present invention will be more clearly understood from the following detailed description when taken in conjunction with the accompanying drawings, in which:

FIG. 3 is an exemplary flowchart illustrating a process of preventing overshoot in an initial current during slow charging according to an exemplary embodiment of the present inventive concepts; and FIG. 4 is an exemplary graph for explaining a determinable time of an estimated charging time according to exemplary embodiments of the present inventive concepts.

DETAILED DESCRIPTION

Figure 1:
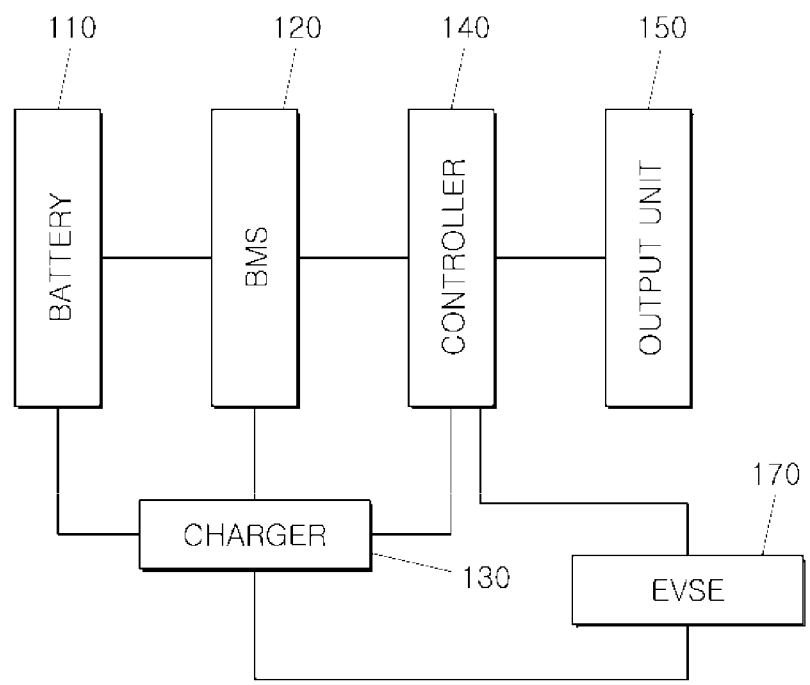
FIG. 1 is an exemplary block diagram illustrating a configuration of an apparatus for preventing overshoot at the beginning of slow charging according to an exemplary embodiment of the present inventive concepts.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiments are described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Throughout the disclosure, like reference numerals refer to like parts throughout the various figures and exemplary embodiments of the present inventive concepts. Furthermore, the terms including expressions, such as first and/or second, used in the specification of the present inventive concepts may be used to describe various elements of the present inventive concept. However, the elements of the present inventive concepts should not be limited by the terms used in the specification of the present inventive concept. In other words, such terms will be used only to differentiate one element from other elements of the present inventive concept.

Hereinafter, an apparatus and method for preventing overshoot at the beginning of slow charging according to an exemplary embodiment of the present inventive concepts will be described below in more detail with reference to the accompanying drawings.

FIG. 1 is an exemplary block diagram illustrating a configuration of an apparatus for preventing overshoot at the beginning of slow charging 100 according to an exemplary embodiment of the present inventive concepts. Referring to FIG. 1, the apparatus for preventing overshoot 100 may include a battery 110, a controller 140 configured to receive initial charging command information during slow charging from EVSE 170 and generate initial charging information for preventing overshoot using the initial charging command information, a charger 130 configured to charge the battery 110 using the initial charging information, a BMS (Battery Management System) 120 configured to generate sensing information by sensing the battery 110 and charge the battery using the sensing information based on an originally set algorithm of the EVSE 170 after a preset time based on whether the charging of the battery 110 is stabilized, and an output unit 150 configured to output the charging information in any form including the use of graphics, characters, sound, or a warning lamp operated by the controller 140 to output a light.

The battery 110 may include battery cells (not shown) arranged in series and/or in parallel. The battery cells may be battery cells for a battery of an electric vehicle, for example a nickel-metal battery or a lithium-ion battery. The charger 130 may be configured to perform quick charging and/or slow charging by converting a current into charging power based on a charging command. Particularly, the charger 130 may be an OBC. In addition, input signals based on the charging command input to the charger 130 and converted output signals may be transmitted to the controller 140 and/or the BMS 120. The signals may be provided as sensed information using a sensing circuit. The controller 140 may be configured to operate components such as the battery 110, the BMS 120, the output unit 150, and/or the EVSE 170, and/or transmit and receive data signals to operate such components. The output unit 150 may include a display system, a sound system, and/or a warning lamp to output a charging state in any form including, but not limited to the use of graphics, characters, sound, a warning lamp lighting and the like. These components may be included within or extraneous to a vehicle cluster.

In general, charging infrastructures may be divided into the EVSE 170, a customer information system (not shown), and a remote infrastructure management system (not shown), which may be connected to a power system. The EVSE 170 may be configured to perform functions such as driver ID (identification) certification, charging available power identification, charging state monitoring, and charging information. In addition, the EVSE 170 may be configured to receive and transmit data, signals, and the like to and from the controller 140 of the vehicle via wired and/or wireless communication. The communication between the EVSE 170 and the controller 140 may be performed using a technology including, but not limited to CAN, PLC, ZigBee, and Bluetooth.

Accordingly, the EVSE 170 may be configured to identify normal transmission and reception (e.g., without interruption or without undue interruption) of vehicle information, battery information, and charging information using an appropriate communication technology, and identify information exchange and charging processes by a monitoring program to detect performance thereof. The battery information may include a state of charge (SOC), a state of health (SOH), etc. In addition, the apparatus may include a storage unit (not shown). The storage unit may be included in the controller 140 or may be a separate storage unit. Accordingly, the storage unit (not shown) may be configured by combination of a nonvolatile memory such as a hard disc drive, a flash memory, an EEPROM (Electrically erasable programmable read-only memory), an SRAM (Static RAM), an FRAM (Ferro-electric RAM), a PRAM (Phase-change RAM), or an MRAM (Magnetic RAM), and/or a volatile memory such as a DRAM (Dynamic Random Access Memory), an SDRAM (Synchronous Dynamic Random Access Memory), or a DDR-SDRAM (Double Data Rate-SDRAM). The storage unit (not shown) may be configured to receive the initial charging command information during the slow charging from the EVSE, and store a program code and/or data, preset information, and the like for realizing an algorithm which performs overshoot prevention using the initial charging command information.

Figure 2:
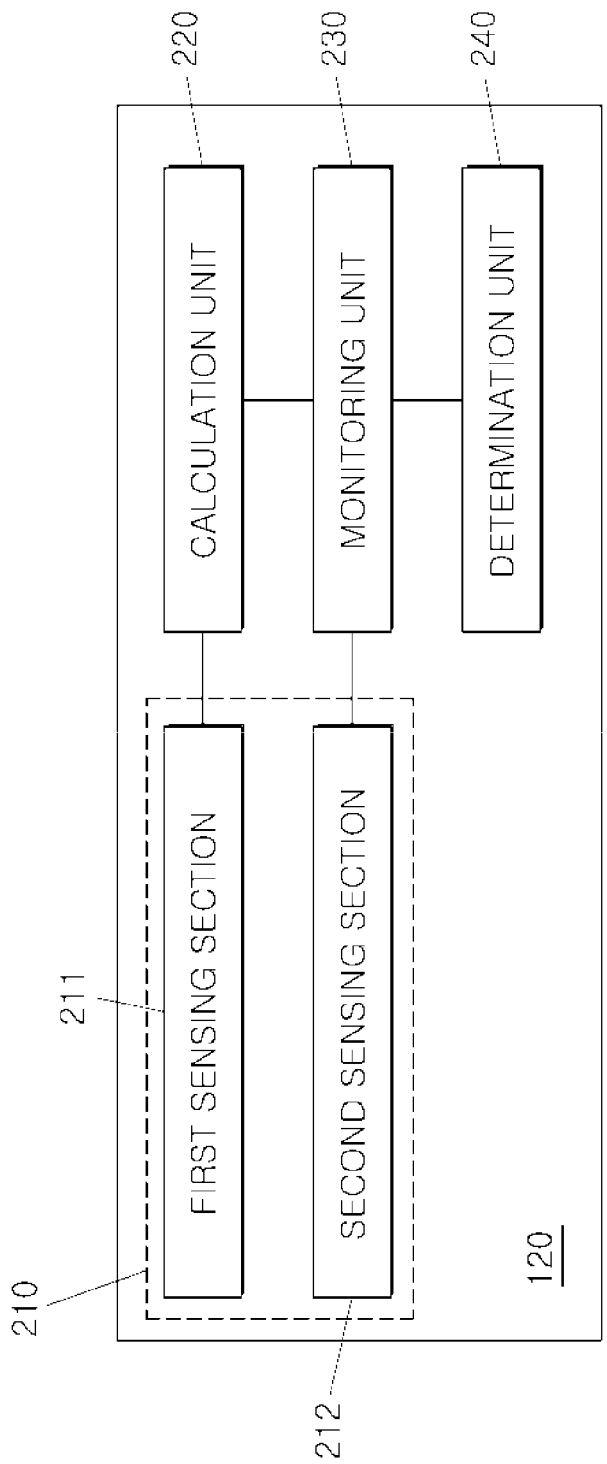
FIG. 2 is an exemplary block diagram illustrating a detailed configuration of a BMS (Battery Management System) shown in FIG. 1.

FIG. 2 is an exemplary block diagram illustrating a detailed configuration of the BMS 120 shown in FIG. 1. Referring to FIG. 2, the BMS 120 may include a sensing unit 210 configured to sense the battery 110 (see FIG. 1) to generate the battery information (SOC, SOH, etc.), a calculation unit 220 configured to calculate a remaining amount of charging of the battery 110, estimate a charging time, etc. using the generated battery information, a monitoring unit 230 configured to monitor the calculated remaining amount of charging of the battery, the calculated estimated charging time, etc., and a determination unit 240 configured to determine whether charging is required or exceeded based on the monitoring information.

The sensing unit 210 may include a first sensing section 211 configured to sense a current of the battery 110 (see FIG. 1) and a second sensing section 212 configured to sense a voltage of the battery 110. In addition to the above components, the sensing unit 210 may further include a power sensor configured to sense power of the battery 110, a temperature sensor configured to sense a temperature of the battery 110, etc. The first sensing section 211 and the second sensing section 212 may be configured to each individually sense battery cells within the battery 110 or sense the battery cells for each pack composed of the battery cells. Accordingly, each sensor may be configured to sense each battery cell or one sensor may be configured to sense individual battery cells. Thus, the sensing unit 210 may be configured to generate sensing information and the sensing information may include a voltage, a current, power, a temperature, an SOC (State of Charge), an SOH (State of Health), etc.

FIG. 3 is an exemplary flowchart illustrating a process of preventing overshoot in an initial current during slow charging according to the exemplary embodiments of the present inventive concepts. Referring to FIG. 3, initial charging command information during slow charging may be received from the EVSE 170 (see FIG. 1) (S310). In other words, the EVSE 170 may be configured to transmit a CP duty (%), (e.g., a charging current command), to the controller 140 of the vehicle at the beginning of slow charging. When the initial charging command information is received, the controller 140 (see FIG. 1) may be configured to calculate initial charging information to allow charging to be performed by a minimal amount (e.g., about 3% or about 1.8 A) of the CP duty (%). The charger 130 (see FIG. 1) may be configured to charge the battery 110 (see FIG. 1) based on the initial charging information (S330). In other words, the charging may be performed using a value less than the initial charging command to prevent overshoot during the slow charging.

While the charging is performed, whether charging is stabilized may be determined by sensing the charger 130 (S340 and S350). In other words, whether the charging stabilization is established may be determined by sensing input signals based on the initial charging information of the charger 130 and output signals based on the initial charging information and determining whether the input signals coincide with the output signals. For example, in a digital method, when five input currents supplied to the charger 130 are present and five output currents are similarly present, the charging may be determined to be stabilized. In other words, when the charger 130 is an OBC, the charger 130 may be configured to generate an output response (e.g., immediately) when receiving the charging command. Thus, when five input commands are present and five output responses that correspond to the same are present, the charging may be determined to be stabilized. However, when five input commands are present and four output responses that correspond to the same are present, the charging may not be determined be stabilized.

When the charging is determined to be stabilized, the charging may be performed by an original amount of charging (e.g., about 1.8 A or greater) according to the algorithm of the EVSE after a preset time (e.g., about 1 to 3 seconds) (S360). In other words, when the charging is determined to be stabilized, the charging may be performed by receiving original charging command information programmed again a preset time. However, when the charging is determined to be not stabilized (e.g., unstable), processes S340 and S350 may be repeatedly performed.

FIG. 4 is an exemplary graph for explaining a determinable time of an estimated charging time. Referring to FIG. 4, a determinable time 420 of an estimated charging time may be generally a time beyond a preset time (e.g., about 1 to 3 seconds) after an initial overshoot section 410 displayed on the graph of FIG. 4. In other words, the estimated charging time may be transmitted to a driver of the vehicle via the output unit 150 (see FIG. 1) after about 12 seconds has elapsed after charging has completed. However, the initial current overshoot section 410 may be removed. Therefore, the estimated charging time may be transmitted to the driver before about 10 seconds without waiting for a preset time (e.g., about 1 to 3 seconds) to elapse. In other words, since a battery capacity may be a value determined by multiplying a charging current and a time, the estimated charging time may be a value reached by dividing the battery capacity by the charging current. Since the estimated charging time is well known to those skilled in the art, description thereof will be omitted.

In accordance with the exemplary embodiments of the present inventive concepts, a charging interruption phenomenon due to overshoot in an initial current may be resolved by charging using a current having a value less than an initial charging current included in a command provided by EVSE and charging after stabilization of the current. In addition, the present inventive concepts may reduce a time for charging a battery to be less than a time determined as an estimated charging time based on a charging current.

While the present inventive concepts has been described with respect to the specific exemplary embodiments, it will be apparent to those skilled in the art that various changes and modifications may be made without departing from the spirit and scope of the invention as defined in the following claims.

What is claimed is:

1. A system for preventing overshoot at the beginning of slow charging, comprising:
    a memory configured to store program instructions; and
    a controller configured to execute the program instructions, the program instructions when executed configured to:
    receive initial charging command information during slow charging from electric vehicle supply equipment (EVSE);
    generate initial charging information for preventing overshoot using the initial charging command information;
    operate a charger configured to charge a battery using the initial charging information, wherein the initial charging information is set to be an amount less than an initial amount of charging of the initial charging command information; and
    operate a battery management system (BMS) to generate sensing information, by the BMS sensing the charger, and charge the battery with the initial amount of charging of the initial charging command information based on an originally set algorithm of the EVSE after a preset time based on whether the charging of the battery is stabilized using the sensing information,
    wherein the initial charging command information includes initial current command information.

2. The system of claim 1, wherein the initial charging command information is a control pilot (CP) duty (%).

3. The system of claim 1, wherein the program instructions when executed are further configured to: determine whether an input signal based on the initial charging information of the charger coincides with an output signal based on the initial charging information to determine whether the charging of the battery is stabilized.

4. The system of claim 1, wherein the preset time is about 1 to 3 seconds.

5. The system of claim 1, wherein the charger is an on-board charger (OBC).

6. The system of claim 1, wherein communication between the EVSE and the controller is performed using a technology selected from the group of technologies consisting of:
    a controller area network (CAN), a power line communication (PLC), ZigBee, and Bluetooth.

7. The system of claim 1, wherein program instructions when executed are further configured to: output an estimated charging time of the battery calculated using the initial charging information.

8. A method for preventing overshoot at the beginning of slow charging, comprising:
    receiving, by a controller, initial charging command information during slow charging from electric vehicle supply equipment (EVSE);
    generating, by the controller, initial charging information for preventing overshoot using the initial charging command information;
    operating, by the controller, a charger to charge a battery using the initial charging information, wherein the initial charging information is set to be an amount less than an initial amount of charging of the initial charging command information;
    operating, by the controller, a sensor configured to sense the charger to generate sensing information;
    determining, by the controller, whether the charging of the battery is stabilized using the sensing information; and
    operating, by the controller, the charger to charge the battery with the initial amount of charging of the initial charging command information based on an originally set algorithm of the EVSE after a preset time in response to determining that the charging is stabilized,
    wherein the initial charging command information includes initial current command information.

9. The method of claim 8, wherein the initial charging command information includes a control pilot (CP) duty (%).

10. The method of claim 8, wherein the stabilization of the charging is determined through whether an input signal based on the initial charging information of the charger coincides with an output signal based on the initial charging information.

11. The method of claim 8, wherein the preset time is about 1 to 3 seconds.

12. The method of claim 8, wherein the charging of the battery is performed using an on-board charger (OBC).

13. The method of claim 8, wherein communication between the EVSE and a controller is performed using a technology selected from the group of technologies consisting of:
    a controller area network (CAN), a power line communication (PLC), ZigBee, and Bluetooth.

14. The method of claim 8, further comprising outputting, by the controller, an estimated charging time of the battery calculated using the initial charging information.

15. A non-transitory computer readable medium containing program instructions executed by a processor for preventing overshoot at the beginning of slow charging, the computer readable medium comprising:
    program instructions that receive initial charging command information during slow charging from electric vehicle supply equipment (EVSE);
    program instructions that generate initial charging information for preventing overshoot using the initial charging command information;
    program instructions that operate a charger configured to charge a battery using the initial charging information, wherein the initial charging information is set to be an amount less than an initial amount of charging of the initial charging command information; and
    program instructions that operate a battery management system (BMS) to generate sensing information, by the BMS sensing the charger, and charge the battery with an initial amount of charging of the initial charging command information based on an originally set algorithm of the EVSE after a preset time based on whether the charging of the battery is stabilized using the sensing information, wherein the initial charging command information includes initial current command information.

16. The non-transitory computer readable medium of claim 15, further comprising: program instructions that determine whether an input signal based on the initial charging information of the charger coincides with an output signal based on the initial charging information to determine whether the charging of the battery is stabilized.

* * * * *